Dec. 19, 1944.   J. BAILEY   2,365,374
METHOD OF SHAPING PLASTICS BY EXTRUSION
Filed April 23, 1941   4 Sheets-Sheet 1

Inventor
James Bailey
by Brown & Parham
Attorneys

Dec. 19, 1944.  J. BAILEY  2,365,374
METHOD OF SHAPING PLASTICS BY EXTRUSION
Filed April 23, 1941  4 Sheets-Sheet 2

Patented Dec. 19, 1944

2,365,374

UNITED STATES PATENT OFFICE 2,365,374

METHOD OF SHAPING PLASTICS BY EXTRUSION

James Bailey, West Hartford, Conn., assignor to Plax Corporation, Hartford, Conn., a corporation of Delaware Application April 23, 1941, Serial No. 389,911

8 Claims. (Cl. 18—12)

This invention relates to the art of shaping organic plastic materials by extrusion thereof through a die to form elongate or continuous shapes of uniform cross-section. Organic plastic materials are referred to herein in the plural as "plastics" and in the singular as "plastic."

This application is a continuation in part of my copending application, Serial No. 303,433, filed November 8, 1939, and is filed in order to disclose the latest and most improved form of the invention—a form having certain advantages over that shown in my earlier application. Certain features of the newly disclosed form of the invention are claimed in another application, Serial No. 389,912 filed on April 23, 1941, jointly by me and Raymond S. Jesionowski.

The invention is particularly directed to, and has for its general object, the extrusion of, certain plastics which because of their tackiness and stickiness and other properties could not be satisfactorily shaped by extrusion prior to this invention or could only be extruded and shaped in thin sections by methods not entirely satisfactory.

Heretofore, most extrusion has been conducted by forming plastics into gels or pastes by the use of volatile solvents or other softening liquids in order to soften them sufficiently to be extruded. This is objectionable because of the time required for curing or drying and because of accompanying shrinkage and deformation often requiring reshaping. But such pastes or gels do not stick very much to the dies and it is feasible and practicable to shape them by extrusion. For this purpose, short dies are used.

It also has been the practice to a limited extent to shape certain plastics by extruding them without the use of volatile solvents or softening liquids. But it is a notable fact that this has generally been limited in commercial operations to production of thin sections by extrusion through short dies. For convenience, this class of plastics is called "solvent free plastics" and the mode of extruding them is referred to as the "dry process." Dry process extrusion is made possible by softening the solid plastic to be extruded by heating it until it is in working condition, forcing it through a die under considerable pressure and hardening the plastic.

But the prior dry process extrusion has not always been satisfactory. Heat-softened, solvent-free plastics may be very tacky and sticky and require considerable pressure to force them through a die. Because of sticking on the surface of the die, the plastic is apt to be badly stressed resulting in objectionable strains after it has been extruded and rigidified. Also, the natural flow of these plastics under pressure through the die and the manner in which they are handled as they extrude, usually prevents them from attaining or from retaining the shape and dimensions of the die at the discharge end thereof.

What is perhaps of greater importance is the fact that these solvent-free plastics usually cannot be shaped satisfactorily by extrusion through the short die of the prior art, that is, a die of the order of one foot or less in length. This is particularly true where thick sections are to be produced at practicable speeds because: First, the plastic is not in a short die long enough to be hardened sufficiently to hold its shape; second, the short die does not permit cooling to a low enough temperature to prevent gas bubbles; third, the short die does not permit cooling gradually enough to prevent vacuum bubbles.

It has been impossible prior to this invention to use a die long enough to avoid the above difficulties because the stickiness or tackiness of the plastics referred to causes them to lock tightly in the die when it is attempted to materially lengthen the die. This locking is due to cumulative friction or sticking, or both, along the length of the die and to cumulative radial components of pressure which result from increasing the longitudinal pressure on the plastic to force it through the die. For example, it would have been impossible prior to this invention to produce in a practicable, efficient manner by extrusion through the short die necessarily used in prior methods, a rod ⅜ of an inch or more in diameter, formed from polymethyl methacrylate molding compound of the type commonly used for injection molding. Heretofore it has been necessary, in order to produce polymethyl methacrylate rods, to cast monomeric methyl methacrylate liquid in molds and then polymerize the monomer by prolonged heating. Although rods of high quality are produced in this way, it is a slow and inconvenient method of shaping plastics.

The general object of this invention is to provide a novel method of shaping plastics by extrusion constituting an entirely new technique in this art, whereby the above and other limitations of the prior art are largely, if not entirely, overcome and certain types of plastics, such as polymethyl methacrylate, can, for the first time, be formed into shapes of substantial thickness by extrusion.

More specifically it is an object of the invention to overcome the effects of sticking or jamming of plastics in extrusion dies by preventing them from touching the surface of the dies in which they are shaped. This is accomplished by providing and maintaining a separable, and preferably immiscible film of anti-sticking substance or lubricant between the plastic and the die surface. The lubricant and plastic may advantageously be admitted separately to the die or forming apparatus and the lubricant removed from the extruded shape.

The maintenance of such a film under the conditions of high pressure and high plastic temperature necessary in extruding solvent-free plastics without undue interruption was found to be very difficult and in fact seemed impossible when first attempted. But considerable experimentation and research resulted in the discovery of the conditions necessary to achieve successful operation, which conditions are described in detail hereinafter. I call this novel method of and apparatus for extrusion the "lubo-film" method or apparatus.

I am aware that various lubricants or dopes have been used heretofore in the art of molding plastics by compression and injection either by mixing the lubricant with the molding compound before molding or by occasionally coating the molds therewith. However, admixture of lubricants impairs the properties of plastics, which is not the case with the present invention, because the lubricant is applied only externally to the plastic as the result of its being separately admitted to the die, maintained as a film in the die and the lubricant is removed from the extruded plastic shape so as not to impair its properties. Merely coating an extrusion die occasionally with lubricant as in compression and injection molding would be impracticable because of the necessity of interrupting operations; it would serve only to lubricate the die temporarily because the plastic would immediately remove the lubricant from the die surface and then stick or jam.

One of the principal advantages of this invention is that it permits the use of a die of almost unlimited length without jamming of the plastic and this irrespective of how tacky and sticky the plastic may be. Therefore it becomes possible to extrude shapes of substantial thickness from solvent-free plastics at practicable speeds because the plastic is in the die long enough to properly and gradually reduce its temperature under pressure without reducing, but in fact increasing the speed or rate of extrusion. In other words, the longer the die used in this invention the greater the rate of production may be and the dies usually employed are of incredible lengths when compared to the longest dies used in prior methods.

Other advantages are that extruded shapes may be produced which are free of gas and vacuum bubbles, free of objectionable strains, and which have the desired shape and dimensions within close tolerances and which have highly polished surfaces.

Other objects and advantages of the invention will be pointed out in the detailed description thereof which follows and which has reference to the accompanying drawings in which:

Fig. 4 is a partial view in horizontal section on enlarged scale of the screw stuffer, die, lubricant connections and other parts of the apparatus shown in Fig. 3a.

The invention will first be described in general after which the two embodiments of the apparatus illustrated in the drawings will be explained in detail. Following this explanation, examples will be given of the novel method as it may be practiced with the apparatus of the invention.

The invention is of particular utility in shaping by extrusion organic solvent-free thermoplastic molding material, such as polymethyl methacrylate and will be described as applied to the production of round rods of substantial thickness from such material, beginning with the material in cold, solid, granular condition, referred to in the art as "molding powder," and ending with the finished product. It is to be understood that the invention is not limited to use in shaping such specific material nor to forming round rods but may be employed in extruding various shapes of various organic thermoplastic and thermosetting compounds.

The organic plastic is first heated as uniformly as possible to soften it to a good working condition, preferably to relatively low viscosity. This operation may advantageously be performed in a heated screw stuffer connected to the die through which the heat-softened plastic is forced under pressure continuously applied to the plastic material to force it through, and impart to it the shape of the die.

A suitable lubricant is selected for use in lubricating the die through which the selected plastic is to be forced and various types of lubricants may be employed. An example of the type of lubricant which I prefer to use in extruding polymethyl methacrylate is hypoid gear oil, or oil of the type used in differential gear boxes of automobiles. This is a mineral oil. The oil or other lubricant should be stable and should not body up or break down at the highest temperature of the plastic when in contact with the lubricant. Such oil may have a viscosity of 1100 to 3000 seconds at 375° F. in order to insure that the lubricant will retain good lubricating properties under high temperature and pressure. This oil gives a better finish on the extruded shape than most other lubricants. The lubricant employed, whether it be oil or other lubricating material, should be immiscible with and inert toward the plastic under the conditions prevailing in the die, although a slight superficial absorption of the lubricant by the plastic material is permissible in some cases. If objectionable, the superficial layer on the extruded shape which may contain lubricant may be removed by a polishing operation. The above type of lubricant gives good results in extruding both polymethyl methacrylate and polystyrene shapes and also other plastics, such as cellulose acetate. Other examples of lubricants are glycerine mixed with metallic soap, and mixtures of glycerine and dextrine. If the lubricant is too viscous, it may be heated to facilitate its flow into the die.

In order to achieve good results, a continuous film of lubricant is maintained on the die, that is, a film which is not broken through at any point between the plastic and the die surface. This usually requires that the film be maintained at all possible points of contact between the plastic and the die. If this is not done the plastic will touch the die surface and stick thereto causing an increase in resistance to the flow of plastic through the die followed by an increase of pressure on the plastic by the stuffer, which is apt to spread the area of sticking until the plastic is jammed in the die. A very slight penetration or puncture of the film may start jamming under the usual conditions of operation.

To insure that the continuous film will be maintained, it is necessary that the lubricant be supplied under very high pressure. However, this immediately leads to difficulty because unless the pressure is correct with respect to the pressure in the plastic, either the plastic will displace the lubricant and sticking will result or the lubricant will displace the plastic and deform it and might event cut off the plastic where the plastic enters the die. There is always a danger of the plastic closing off the inlet or inlets through which the lubricant flows into the die and conversely there is a danger of the lubricant flowing backwardly through the plastic into the stuffer. When that happens the batch of plastic in the apparatus is spoiled and must be discarded.

To provide the necessary control for maintaining a film of lubricant as stated above, the lubricant is conducted from a source of high pressure and admitted to the die in a quantity sufficient to partially fill the die after which plastic is delivered into the die and forced therethrough. The lubricant should be supplied under constant pressure. As the plastic passes through the die, a flow of lubricant is maintained into and through the die, the lubricant being caused to enter the die around a nozzle from which the plastic material issues into the die, the plastic also being surrounded by the lubricant where it issues from the nozzle. In fact, in starting the operation with the die empty, the plastic should be surrounded throughout its length by a substantial quantity of lubricant, a surplus of which is maintained in the die until a thread or string of plastic material is formed and issues therefrom. But this surplus must not be excessive because that might cut the plastic.

When a proper flow of the plastic material has been established, the flow of lubricant may gradually be reduced, lubricant in the die being displaced by the plastic and forced out of the discharge end of the die until finally only a thin film of lubricant remains between the plastic and the die surface. This film may be about .0005 of an inch thick. The lubricant at the nozzle or jet is forced back by the plastic material until only a small body or bubble remains which surrounds the nozzle and the plastic issuing therefrom, this body of lubricant being sufficient, however, in normal operation and under the proper conditions of pressure and flow to prevent the plastic material from flowing backwardly around the outer surface of the nozzle and into the inlets for the lubricant.

Figure 1:
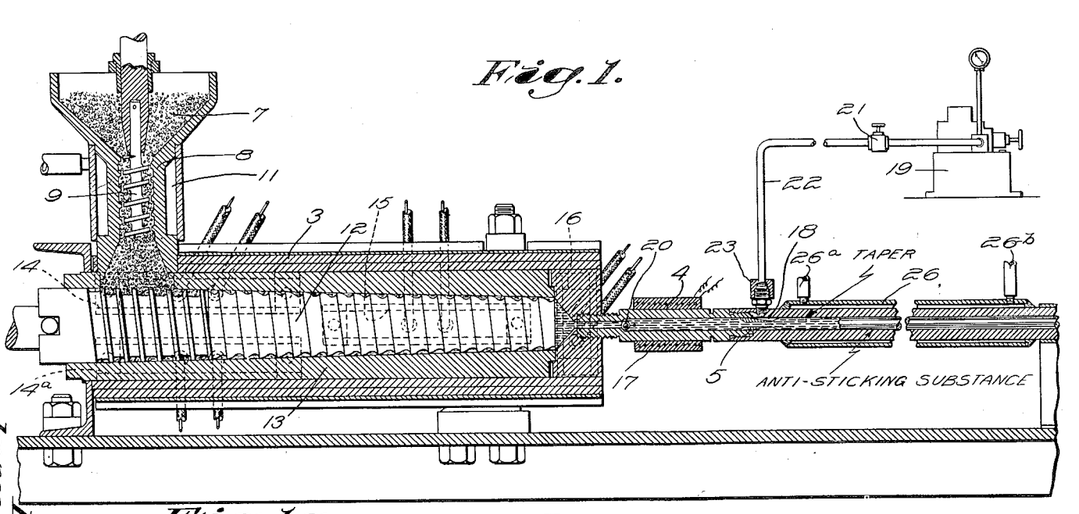
Figure 1 is a view in longitudinal section of one form of apparatus embodying the invention showing a screw stuffer and the adjoining portion of a die with lubricant connections.
Figure 2:
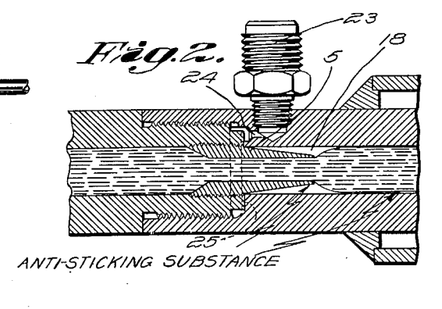
Fig. 2 is a view on an enlarged scale in vertical section showing the nozzle and associated lubricant connections.

The lubricant must be supplied under a pressure which is always greater than the normal operating pressure on the plastic material and must also be supplied under a pressure which is greater than the maximum pressure which may be exerted upon the plastic material in the die at any time. In the apparatus of Figs. 1 to 2, a pressure of 4,000 pounds per square inch is maintained; in that of Figs. 3a to 3e, a pressure of 6,000 to 7,000 pounds per square inch. At the same time, however, a flow of lubricant into and through the die during normal operation must be maintained but at a critically low rate related to the unit surface area of the plastic shape extruded per unit of time. If this critical rate of flow is not maintained sticking may result, or the plastic may be deformed by displacement thereof by an excessive amount of lubricant in the die. To maintain this critically low rate of flow, it is necessary to provide special, accurate, throttling or regulating means to insure that the lubricant will flow into and through the die at a constant rate of only a few drops per minute.

Under the preferred conditions of operation, the pressure of the lubricant in the die will be responsive to and equal to the pressure on the plastic within the die. In other words, the lubricant in the die and the plastic will normally be in pressure equilibrium or hydrostatic balance. This condition is highly desirable and in fact necessary for stable operation in order to maintain a continuous film during prolonged operation; furthermore, certain special conditions must be maintained to insure that this pressure equilibrium if disturbed will instantly be restored. This is explained below with reference to Figs. 4 and 5.

The advantage of maintaining the lubricant in the die in pressure equilibrium or hydrostatic balance with the plastic and in a condition responsive to the pressure on and in the plastic material in the die is that if the film is punctured and local sticking starts at a point on the die surface, the resulting increase of pressure on the plastic, resulting from increased resistance to flow, will instantly build up the pressure in the lubricant in the die, thus tending to restore the film of lubricant at the point or in the area where it has been punctured. This is an advantage in addition to the advantage of substantially reducing friction, preventing sticking and counterbalancing the radial components of pressure exerted through the plastic against the wall of the die.

Even though the above precautions are taken to prevent sticking of the plastic to the die and to relieve incipient sticking and the resulting jams which might otherwise occur, occasionally the plastic sticks in a manner which is not automatically corrected, as explained above, and a jam results. In this event, the plastic may be dislodged by promptly cutting off the flow of plastic into the die, cutting off the flow of lubricant into the die, and permitting the plastic in the die to cool and shrink. If a bad "hang-up" is to be avoided, plastic and lubricant must both be cut off when sticking occurs to remove pressure from the plastic in the die. This prevents spread of the sticking area. After the plastic has been permitted to shrink without pressure thereon, the lubricant is then suddenly admitted at extremely high pressure of the order stated above so as to deliver a fluid pressure blow to the plastic in the die and thus dislodge it and break the jam. If the jam is not broken on the first attempt, the plastic material is allowed to cool further and lubricant is again admitted suddenly under high pressure to break the jam.

Because of the fact that the plastic shape slides through the die in or on a film of lubricant in pressure equilibrium with the plastic, stressing and resulting strains are greatly reduced. In prior methods, when the hot plastic flows into the die, it stiffens and adheres to the die surface and succeeding plastic must be forced through this stiffened plastic throughout the entire length of the die in order to fill the die and compensate shrinkage. This results in shearing stresses and resulting strains. Furthermore, in prior methods the plastic swells somewhat where it leaves the die and tends to become spherical. On the other hand, in the present method, as the plastic flows into the die and stiffens, it slides bodily through the die instead of adhering to the surface of the die. Shearing stresses are largely avoided because there is very little flow of the hot incoming plastic through the outer chilled plastic already in the die; this occurs only in a relatively short zone near the entrance to the die where the plastic is relatively hot and stresses are at a minimum. Beyond this zone, shrinkage is compensated by longitudinally squeezing the shape by back pressure thereon.

Furthermore in the present invention, there is no appreciable swelling where the plastic issues from the die as in prior methods. Therefore, the extruded shape corresponds to the shape and dimensions of the die within close tolerances, allowing for such shrinkage as results from cooling of the shape after extrusion.

Sufficient back pressure may be maintained in carrying out my novel method to insure that gas bubbles and vacuum bubbles are prevented, assuming that a proper temperature treatment is applied to the plastic. Back pressure should be 150 pounds or more per square inch. Gas bubbles may be caused by volatiles, such as air, solvents, or gases given off by the plastic resin or compound itself. To prevent gas bubbles, the plastic must be held under a pressure greater than the maximum vapor pressure and the temperature of the plastic reduced below a certain temperature critical for the particular plastic and held below this temperature for a certain length of time.

To prevent vacuum bubbles, a substantial temperature difference between the exterior and interior of the plastic shape must be avoided. Otherwise the exterior will harden under compression, thereby setting up tension on the interior which ruptures the plastic, thus forming vacuum bubbles. Prevention of vacuum bubbles requires a "long temperature gradient," that is, gradual temperature reduction and the thicker the shape the longer the gradient for the same plastic. Therefore, to prevent both gas and vacuum bubbles, the plastic must be held under pressure and cooled for sufficient time and to do this in the die and produce relatively thick shapes at practicable speeds, a long die must be used. The longer the die, the greater the speed at which the shape may be extruded.

Although the invention permits the use of a die of almost unlimited length, a substantial part of the temperature treatment may conveniently be performed after the shape has left the die. In shaping thermoplastics, it is preferred to extrude the shape with sufficient heat content to reheat the surface of the shape in the atmosphere. This usually results in a lustrous surface on the shape. The shape may then be permitted to cool by exposure to room or plant atmosphere with or without forced cooling, such as provided by one or more water sprays. Such cooling also must be gradual in order to prevent vacuum bubbles. It is preferred to hold the shape straight as it is cooled or hardened and to support it at spaced points as it travels to prevent deforming or flattening it. The shape may be cut into desired lengths.

Figure 1A:
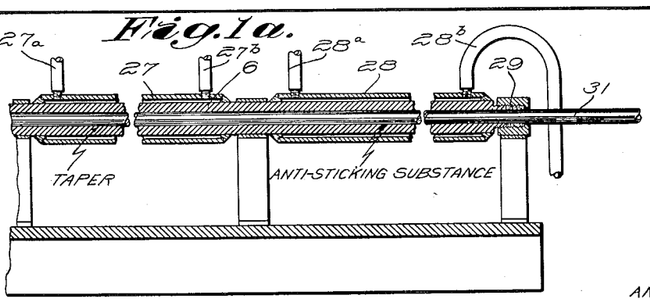
Fig. 1a is a similar view of the remaining portion of die.

Referring now to the apparatus of my invention shown in Figs. 1 to 2 of the drawings, there is shown at 3 a screw stuffer device which discharges plastic into a conduit 4 in which is mounted a nozzle 5, which in turn delivers plastic to die 6.

Molding compound indicated at 7 is supplied to a feeding device including casing 8, containing feed screw 9 driven by suitable means, not shown. Casing 7 is jacketed at 11 for cooling medium to prevent heating and sticking of the molding compound at this point.

The screw 12, also driven by suitable means not shown, forces the molding compound through the horizontal bore of the casting 13 of the stuffer and during this travel of the compound, it is heated first by strip heaters 14, 14a, then by strip heater 15 and finally by strip heater 16. Conduit 4 preferably is heated by a resistance or other type of heater 17 to control the temperature of the plastic as it is forced through nozzle 5.

Nozzle 5 is threaded into the discharge end of the conduit 4 and is tapered as shown to leave a space at 18 for the anti-sticking substance, such as oil. This substance is supplied by a suitable pump 19, past a regulating or pressure reducing valve 21 in a conduit 22. Conduit 22 is connected through a union 23 to a passage 24 in die 6 from which the substance flows through minute passages formed at 25 in the end of conduit 4 into the space 18 surrounding nozzle 5. In order to prevent the flow of oil or other substance into the stuffer, when operation of the stuffer is stopped, a ball check valve 20 may be provided in the inlet end of conduit 4.

Die 6 is provided with jackets 26, 27 and 28 for temperature controlling medium supplied thereto and discharged therefrom through conduits 26a, 26b; 27a, 27b, and 28a, 28b.

The die 6 may be outwardly tapered for about two-thirds of its length from nozzles 5. This taper may be of the order of .0017 inch per foot.

At the discharge end of the die is shown a gland 29 which may be tightened on the rod 31 being extruded, to exert back pressure on the rod in the die so that the material is compressed longitudinally and caused to fill out the die as it issues therefrom. This gland or stuffing box also serves to remove or separate the lubricant from the surface of the rod 31 as it issues from the die.

Preferably a small hole (not shown) is drilled in the die just ahead of the stuffing box or gland or through the inner end of the gland nut to permit the lubricant to flow or drain out of the die just ahead of the gland. This has been found desirable in order to prevent accumulation of lubricant in the die, particularly adjacent the gland which would displace the plastic and deform the rod causing a flat spot or other defect. If sufficient back pressure is developed in the die without the use of a gland or stuffing box, the lubricant may be permitted to drain out of the end of the die and removed from the rod by means of a cloth or wiper engaging the rod in its travel outside of the die.

Although the apparatus shown in Figs. 1a and 2 may be successfully employed for extruding rod according to my novel method, certain difficulties were experienced therewith largely because of instability in operation. It was found to be difficult to maintain the operation over a prolonged period of time with such apparatus because of too frequent sticking and jamming, because of the plastic shape being deformed by excessive or variable flow of lubricant, or because of the flow of lubricant into the die being blocked off by the plastic material. Also, it was found desirable to make special provisions to insure the production of straight rod.

Figures 3A, 3B, 3C:
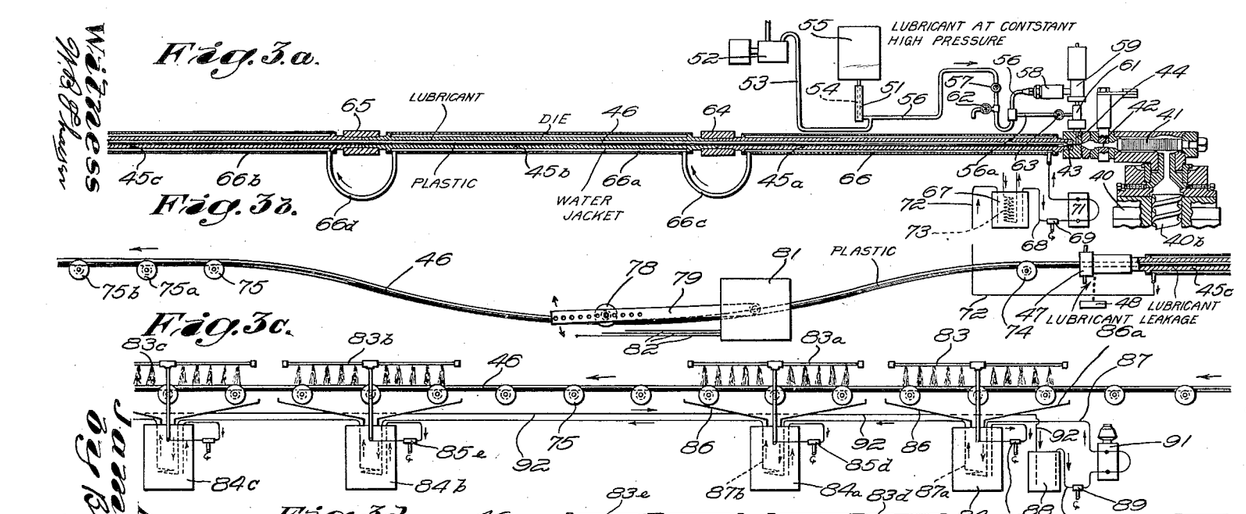
Figs. 3a, 3b, 3c, 3d and 3e are views partly in section, partly in elevation, and partly diagrammatic, showing when arranged to the left in the order named substantially complete apparatus of improved type embodying the invention, substantially the full length of the apparatus being shown to scale.
Figures 3D, 3E:
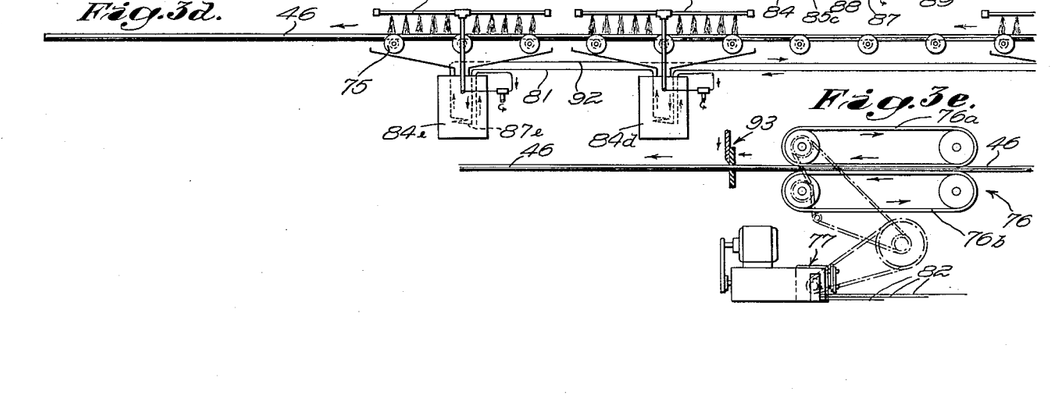
Figure 4:
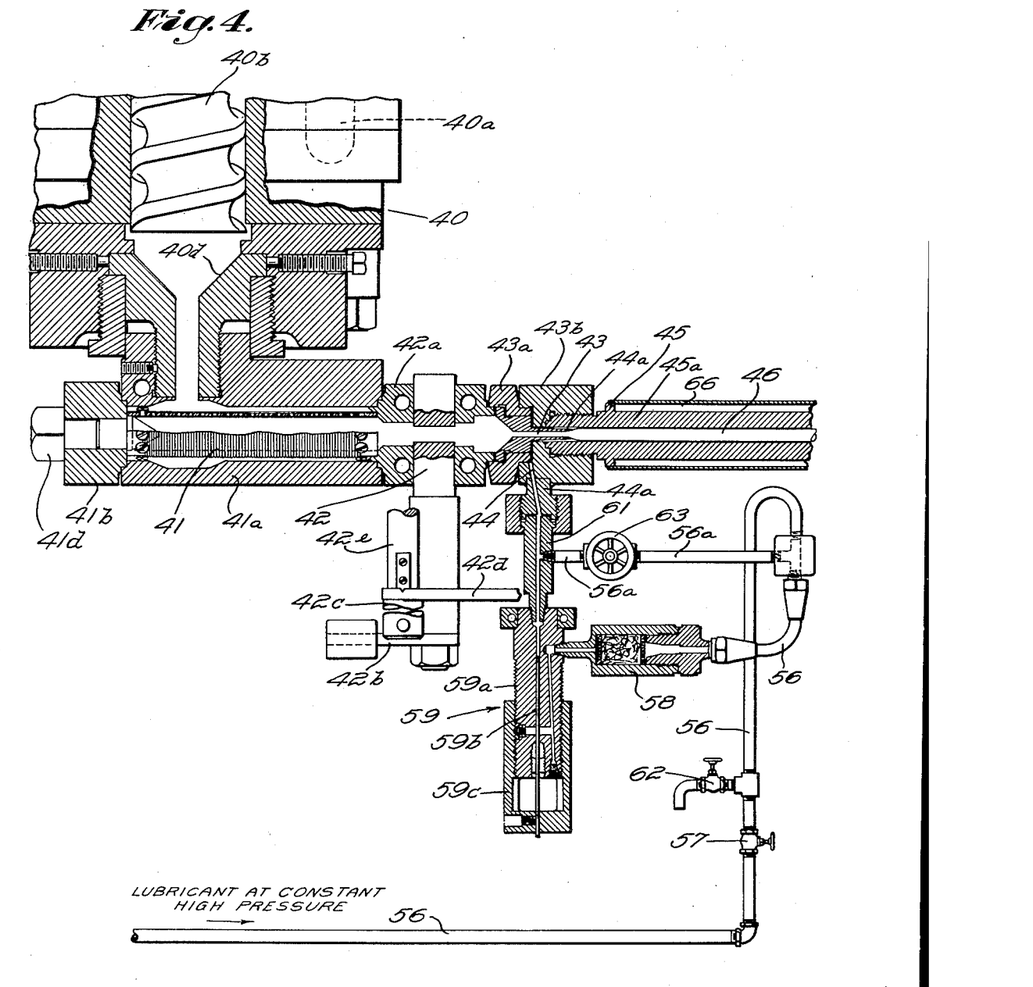
Figure 5:
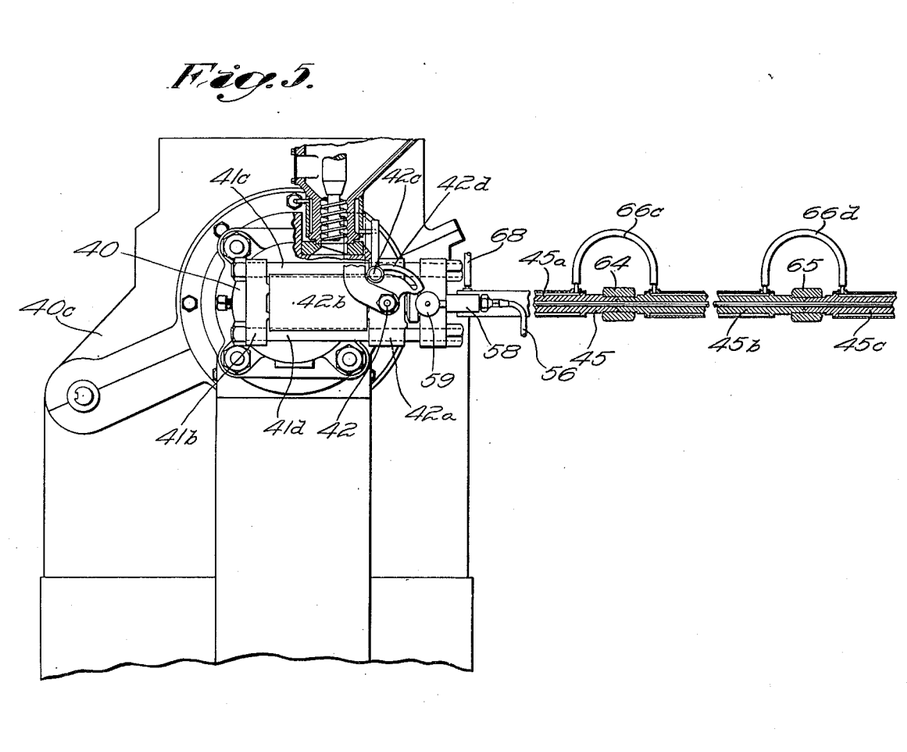
Fig. 5 is a view in front elevation showing somewhat more fully the apparatus in Fig. 4.

To overcover the above and other difficulties of the apparatus shown in Figs. 1, 1a and 2, and the method performed therewith, an improved method and improved apparatus were devised, the apparatus being illustrated more or less diagrammatically in Figs. 3a to 3e inclusive, and shown more fully in Figs. 4 and 5.

Referring first to Figs. 3a to 3e inclusive, it will be understood that when Fig. 3b is placed to the left of Fig. 3e, Fig. 3c to the left of Fig. 3b, etc., the said figures show in reduced scale full length apparatus embodying the invention in operating condition. These figures collectively show particularly well the extraordinary length of the die and of the entire apparatus together with a long length of rod in process of formation within a film of lubricant, extrusion of the rod, reheating, cooling while straightening, and cutting off.

Fig. 3a shows a heat-jacketed stuffer 40 of the screw type into which molding compound is introduced in solid condition and is heated and worked until it is softened to the desired working condition. From the stuffer 40 the plastic flows through a homogenizer and filter 41, thence through a plastic valve 42 and into and through a nozzle 43 surrounded by lubricant admitted through passage 44 from a source and through connections which will later be described. The lubricant thus supplied surrounds the plastic where it issues from the nozzle and flows through the die 45 in the form of a very thin film on the surface of the die and surrounding the plastic material which is shaped into a rod 46 during its passage through the die.

The die illustrated in Figs. 3a and 3b is approximately ten feet three inches long, this length being used advantageously for producing the rod 46 which, as shown, is intended to be 3/8" in thickness. The end of the die carries a stuffing box 47 which may be tightened more or less to apply the desired back pressure to the rod during extrusion thereof and which serves as a very efficient means to remove the lubricant from the surface of the rod just before it issues from the die. A small opening is drilled in the die or in the gland nut of the stuffing box to permit drainage of lubricant which may be caught in a pan, as shown at 48. This prevents deformation of the rod 46 which otherwise might result from accumulation of a surplus amount of lubricant within the die, especially near its discharge end.

The lubricant is supplied to passage 44 under a constant high pressure of about 6,000 pounds per square inch by an accumulator 51, which is charged at intervals with lubricant by a pump 52 which draws lubricant from a suitable receptacle, not shown, and discharges it through a conduit 53 into the accumulator. The accumulator supplies the lubricant under constant pressure and prevents deformation of the plastic shape which might otherwise result from the pulsating effect of the pump acting on the plastic through the lubricant leading into the die and surrounding the plastic.

The piston 54 of the accumulator is raised against the weight 55 until the accumulator is filled. From the accumulator the lubricant flows under constant pressure of weight 55 through pipe 56 past a main valve 57 through filter 58 and throttle 59, thence through a short pipe section 61 into the passage 44. The line 56 is provided with a drain 62 and is connected to a by-pass line 56a controlled by a by-pass valve 63, line 56a joining the short connection 61 and serving to by-pass lubricant around the filter 58 and throttle 59. The details of these parts are described below with reference to Figs. 4 and 5.

It will be understood that during normal operation, the lubricant flows under high pressure through the line 56, filter 58, throttle 59 and connection 61 into passage 44 at a constant minute rate of flow of a few drops per minute, determined by the adjustment of the throttle 59. However, in starting the operation, the by-pass is used to conduct the lubricant into the die either above or in conjunction with the main line 56. The by-pass also is used for breaking jams.

In starting the operation with this apparatus, the plastic valve 42 is closed, as also is main valve 57 and by-pass valve 63. The stuffer is heated and plastic fed into it if necessary to charge it after the stuffer has been started. The stuffer is allowed to run until well filled with plastic and until pressure builds up sufficiently to bring the plastic in good working condition up to the plastic valve ready to flow into the die 45 when valve 42 is opened.

Before plastic is admitted to the die, the die must be cleared, that is freed of plastic or the plastic therein completely surrounded by lubricant and made freely movable under pressure.

A shot of lubricant may now be admitted into the die as by closing drain valve 62 and opening main valve 57 and by-pass valve 63. The entire column of the accumulator may be so admitted. Valve 42 being closed, no lubricant may flow into the filter or stuffer.

Valve 42 is now opened slightly to permit plastic to enter the die 45 and may be opened more and more as the flow of lubricant is reduced by gradually closing by-pass valve 63, which is so manipulated as to permit the plastic to form a continuous string and then fill the die, as explained above. The plastic is admitted gradually at first to prevent it from surging through the die.

As the plastic approaches its full shape, the control of the flow of lubricant may be taken over by line 56 and throttle 59, the by-pass valve 63 finally being closed. Care must be taken in reducing the flow of lubricant and increasing the flow of plastic to prevent the plastic from displacing the lubricant around the nozzle 43. To guard against this, the lubricant should be maintained in a body or bubble of substantial thickness around the plastic for a short distance beyond the end of the nozzle as shown in Figs. 2 and 4 and should be brought to this condition very gradually by proper manipulation of the valves 42 and 63 and by the throttle 59, if it has not previously been set in adjusted position for normal operation.

In the production of certain shapes, such as rods 1 inch thick, the plastic valve 42 is not opened very widely and thus serves to provide back pressure in the filter and the stuffer, thus insuring good density and elimination of air pockets in the plastic. This also protects the filter against collapse. In producing smaller shapes, valve 42 is opened fully, the nozzle or jet providing the desired back pressure.

In case of a jam, plastic valve 42 is closed, the stuffer is shut off, main valve 57 is closed and drain 62 is opened. This takes the pressure off of the plastic in the die, permitting it to shrink out of contact with it where it stuck in causing the jam. Drain 62 is provided to drain out any leakage which might flow past main valve 57 and accidentally exert pressure on the rod in the die. When the plastic has cooled and shrunk somewhat, the jam is broken by first closing valve 62 and opening valve 57 and then suddenly opening by-pass valve 63 to apply a fluid pressure shock to the plastic. This blow is repeated after further cooling if necessary.

Because of the relatively great length of the die 45 compared to its diameter, it is conveniently formed in sections instead of in one piece, the die illustrated being formed in three sections, 45a, 45b and 45c, the adjoining ends of which are threaded and joined by unions 64 and 65. Each section of the die is provided with a jacket, as shown at 66, 66a and 66b, connected at the joints in the die by conduits 66c and 66d. These jackets receive temperature controlling medium to control the temperature of the plastic within the die. Water may conveniently be used for this purpose and in the production of thermoplastic shapes of substantial thickness it is usually necessary to heat the water in order to prevent cooling the plastic shape too quickly, which might result in vacuum bubbles in the extruded shape. In the apparatus as illustrated in Figs. 3a and 3b, water is drawn from a receptacle 67 through line 68 by a rotary pump indicated at 69, the line 68 passing through a heater 71 and thence into jacket 66 at the end thereof where the plastic material enters the die through the nozzle 43. The heated water then flows through the jackets 66, 66a and 66b, and finally is discharged from the end of the jacket 66b near the discharge end of the die into a return pipe 72 which leads into the receptacle 67.

As the water circulates through the jackets of the die it picks up a certain amount of heat from the plastic material and this heat must be dissipated in order to prevent the temperature of the water from rising above the desired temperature. This is accomplished by means of a water cooling coil indicated at 73 in the receptacle.

It will be understood that suitable temperature controlling means (not shown) may be associated with the water circulating system for the die to maintain the desired temperature and temperature gradient in the die to properly cool the plastic material which is forced therethrough in accordance with the method of the invention.

To prevent deformation of the plastic shape or rod after it has issued from the die, it preferably is supported by rollers having minimum contact with the shape or rod. The contact of the rod at any one point on its surface with any of the rollers is line contact and only momentary, and, therefore deformation is prevented, such as would occur for example if the rod were permitted to rest on a conveyor belt.

Thus there is shown near the discharge end of the die a roller 74, and at a substantial distance beyond the roller 74 a flight of rollers 75, 75a, 75b, etc. is provided, the rollers being fairly close together and extending along the length of the apparatus well toward its end, as shown in Fig. 3d.

The rollers 74, 75 and 75a may be made of wood or other material of insulating character which will not unduly chill the plastic material. The rollers shown are provided with semi-circular grooves to fit approximately the round shape of the rod 46, although it will be obvious that the rollers may have different forms, depending upon the shapes of the extruded products.

In order to hold the rod straight as it cools, a puller indicated generally at 76 near the end of the apparatus may be provided. The puller illustrated comprises two endless belts 76a and 76b, the adjacent strands of which travel to the left and grip the rod, as shown. The puller maintains a tension on the rod and holds it straight as it is cooled.

With some types or sizes of rods, or with some types of materials, the rate of extrusion may vary as much as 10%. Therefore, it may be desirable to synchronize the speed of the puller to a variable rate of extrusion from the die. This may be accomplished by providing a variable speed control mechanism for the puller, as indicated generally at 77, which varies the speed of the puller in accordance with the amount of sag in the rod between the rollers 74 and 75 where the rod is engaged by the roller 78 on the lever 79 of the puller speed control switch 81. This switch is connected to the speed controller by the three wires 82, as shown in Figs. 3b and 3e. When the rod between the rollers 74 and 75 approaches a horizontal position the speed controller slows down the puller and when the rod moves downwardly because of the slack resulting from the rate of extrusion exceeding the rate of pulling, the puller is speeded up to take up the slack.

The speed control mechanism for the puller may in some cases be dispensed with and the rod between rollers 74 and 75 held in horizontal position by additional rollers. In this case, the speed of the puller is set to run at least as fast as the rod is extruded, but its grip on the rod is so adjusted that if the rate of extrusion is less than the puller speed then the puller will slip on the rod enough to maintain a substantially constant pull on the rod and keep it straight.

In Fig. 3b, the rod may start to reheat as soon as it issues from the die and continues to reheat for some distance, say up to the first roller 75 or thereabouts. After a certain amount of reheating has been effected, cooling of the rod begins, the exact point where this occurs varying with the type of material being shaped and depending upon the established conditions of operation.

Certain types of shapes and shapes of certain materials may conveniently be cooled by one or more water sprays, as shown at 83, 83a, 83b, 83c, 83d and 83e, so located as to direct streams downwardly over the rod in order to cool it uniformly over its entire circumference as it passes beneath the respective sprays.

Each of the sprays receives water from a receptacle 84, 84a, 84b, 84c, 84d and 84e from which the water is drawn by pumps indicated at 85c, 85d, 85e, which deliver the water to the sprays. The spray water is caught by troughs indicated at 86 and 86a associated with each of the sprays and these troughs discharge the water back into the receptacles 84a, 84b, 84c, 84d, 84e.

It is desirable to control the temperature of the cooling water delivered through the sprays 83a, 83b, 83c, 83d, 83e, in order to rapidly cool the rod, but not to cool it too rapidly. For this purpose, a heat exchange circulating system is provided which is common to all the receptacles 84a, 84b, 84c, 84d, 84e, and which comprises a supply line 87 leading from a receptacle 88 and through which the water is circulated by a pump 89, the line 87 passing through a heater 91 and thence through the various receptacles 84a, 84b, 84c, 84d, 84e, in which the line 87 is given the form of coils 87a, 87b, 87c, 87d, 87e. From the last receptacle 84e a return line 92 carries the water back to the receptacle 88.

In some cases the water sprays are not used and the extruded shape is cooled simply by exposing it to room or plant atmosphere.

As shown in Fig. 3e, a cut-off device 93 may be provided for cutting the extruded shape into suitable lengths. At this point the extruded shape or rod will have been cooled to almost room temperature and will have attained approximately its normal hardness.

The stuffer and associated parts and the connections for applying lubricant to the die are shown in detail in Figs. 4 and 5. The stuffer 40 comprises a heating jacket 40-a for hot oil or water and contains a screw 40-b, a drive for which is enclosed in a housing 40-c, Fig. 5.

Plastic material flows from the stuffer 40 through nipple 40-d, having a conical inlet and reduced outlet and held in the head of the stuffer by a threaded bushing and screws, as shown in Fig. 4. The nipple 40-d is screw-threaded into the block 41-a for the filter 41 which is held in place between the head 40-b at one end of the block 41-a and the casing 42-a of the plastic valve secured to the other end of the block. The filter 41 comprises a metal perforated cylinder wrapped with wire mesh cloth preferably of extreme fineness, such as 700 wires per linear inch, in order to remove all foreign matter, even matter as fine as lint, and to form a "smooth colloid" by making the plastic material uniform in viscosity. The plastic material is heated to relatively high temperature and reduced to relatively low viscosity in the stuffer to permit it to flow through such extremely fine screen. The block and filter are heated by conduction of heat from the stuffer.

As shown in Fig. 4, the plastic valve 42 is of the rotary plug type and has a handle 42-b for turning it. The valve may be securely held in adjusted position by means of a screw 42-c passing through a slot in segment 42-d in the valve plug, the screw being threaded into a stud 42-e secured to the valve block 42-a.

The plastic valve discharges into nozzle 43 projecting into die 45. Nozzle 43 is of small cross section and has a thin wall and is formed on a thick, flanged body as shown engaged by a retaining ring 43-a fitted onto valve block 42-a and fitted into a member 43-b threaded onto die 45. Member 43-b contains passage 44 for lubricant which flows into the bushing at the rear end of the nozzle into an annular space 44-a between the interior of member 43-b and the nozzle 43. From the rear of this annular space, the lubricant flows over the entire outer surface of nozzle 43 and over the entire surface of die 45.

The plastic receiving parts between the stuffer and the die are subjected to very high pressure and are apt to break and plastic is apt to escape through the joints. To avoid breakage, these parts are made with very heavy walls and leakage of the fluent plastic is prevented by drawing the parts together with heavy strain bolts 41-c and 41-d which extend through ears in head 41-b, valve blocks 42-a and 43-b. By removing the bolts, the parts may readily be removed for cleaning, repair or replacement.

Passage 44 in bushing 43-b receives lubricant from the short pipe 61 coupled to nipple 44-a, welded to member 43-b as shown in Fig. 4. Pipe 61, nipple 44-a and the block 59-a of throttle 59 have very thick walls and small bores to prevent "spring" in the lubricant connections between the throttle and the die and to keep the volume of lubricant as small as possible between these points. This insures that a small incompressible amount of lubricant will be trapped, so to speak, between the throttle 59 and the plastic in the die and in an unyielding enclosure in the event of sudden increase in pressure in the plastic material in the die resulting from local sticking or other causes. Consequently the pressure of the lubricant will be instantaneously responsive to changes in plastic pressure, insuring continued hydrostatic balance between them. Not only does this tend to prevent or relieve sticking, it also prevents a flow of the plastic around the nozzle 43 and rearwardly of its tip which might cut off the flow of lubricant and cause sticking or jamming.

Throttle 59 comprises a needle 59-b having a sliding fit in its bore which is moved inwardly and outwardly by turning the hollow handle 59-c in which it is secured at its outer end. The handle 59-c is screw-threaded on the block 59-a of the throttle. When the needle 59-b is moved into the block, the resistance to flow of lubricant between it and the bore is increased and when moved outwardly, the resistance to flow is decreased. This provides for the minute, critical flow of lubricant required which could not consistently be obtained by the usual type of needle valve because of abrasion of the seat of such a valve by the needle engaging it or because of wire drawing of such a valve or for other reasons.

*Example I*

Commercial methyl methacrylate molding powder is heated in a stuffer and discharged from the stuffer through a nozzle into the die. The stuffer may be heated in a first zone to about 370° F., in a second zone to about 390° F., and in a third zone to about 360° F. to 380° F. The nozzle end of the die preferably is maintained at about 350° F., so that the material is still quite hot and very sticky where it enters the die. The die may be about 15 feet long and the rod extruded at the rate of 50 inches or more a minute.

The temperature of the die may be that resulting from a jacket temperature of about 145° F. in a first zone of about 4 feet, a jacket temperature of about 130° F. in a second zone of about 5 feet, and a jacket zone of 70° F. in a third zone of about 5 feet.

Lubricant is caused to flow through the die in the form of a film covering the entire surface of the die at a rate of approximately .01 cubic inch per foot of length of rod extruded. Such flow of oil is preferably maintained under pressure of 4000 pounds or more per square inch at the source of supply.

The plastic in the die is maintained under a pressure of at least 150 pounds per square inch and the normal pressure may be 300 or 400 pounds per square inch and the pressure may reach 1000 pounds per square inch, depending upon requirements.

The rod surface may be permitted to reheat, by equalizing of its temperature with that of the hotter interior, as and after the rod issues from the die to form a lustrous surface and may be cut into lengths near the point of issue and permitted to cool and harden into its final shape and dimensions while supported in suitable trays.

*Example II*

Polymethyl methacrylate molding powder is formed into rod ⅜" in diameter by heating it in a stuffer and passing it through a filter held at approximately 415° F. and then discharging the material through a nozzle and into a die 10 feet 3 inches long through which lubricant is caused to flow in the form of a film on the die surface at the rate of 20 drops per minute under pressure of approximately 6000 pounds per square inch. A temperature of about 146° F. is maintained in the die jacket. The rod may be extruded at the rate of about 11.2 feet per minute or about 39 pounds per hour.

*Example III*

Polymethyl methacrylate molding powder is formed into rod 1" in diameter by heating the compound in a stuffer and passing it through a filter held at approximately 400° F. and discharging it through a nozzle into a die which is 14 feet 6 inches in length. Lubricant is caused to flow through the die in the form of a film covering the die surface at the rate of 9 drops per minute under pressure of approximately 6000 pounds per square inch. The die temperature corresponds to that of a jacket temperature of approximately 160° F. at the inlet of the die. The rod may be extruded at the rate of 1½ feet per minute, or 38¼ pounds per hour.

*Example IV*

Polystyrene molding powder is formed into rod ⅜ inches in diameter by first heating it in a stuffer and passing it through a filter held at 433° F. and discharging the highly heated plastic through a nozzle into a die which is 10 feet 3 inches in length. Lubricant is forced through the die in the form of a film covering its surface at the rate of 12 drops per minute under a pressure at the source of approximately 6000 pounds per square inch. The temperature of the die corresponds to that of a jacket temperature of 171° F. The rod may be so extruded at the rate of 10.4 feet per minute, or 33 pounds per hour. The rod thus produced from polystyrene molding compound has a dull surface.

*Example V*

Polystyrene molding compound is subjected to heat and pressure in a stuffer and passed through a filter held at approximately 433° F. and then discharged through a nozzle into a die 14 feet 6 inches long and formed into a rod 1 inch in diameter. The jacket temperature of the die at the inlet end of the die may be 186° F. and the flow of lubricant through the die may be regulated to 11 drops per minute. The rod may be extruded at the rate of 1.7 feet per minute, or 38 pounds per hour.

In Examples II to V above, a temperature gradient may be maintained in the die corresponding to a rise of about 10° F. in the jacket water from the inlet to the discharge end of the die, a substantial amount of heat being transferred from the plastic into the jacket water so that the rod is cooled gradually and substantially hardened in the die.

Various changes may be made in the details of construction of the apparatus and in the mode of performing the method of the invention without departing from the scope of the appended claims. In addition to rods, tubes and ribbons may be made and in making tubes, lubricant may be applied to either or both sides in the manner disclosed herein. It will be understood that in the shaping of thermosetting organic plastics, the temperature of the die is so controlled as to deliver heat to, rather than to remove heat from the plastic material in the die, although some cooling of such thermosetting plastic in the die may desirably be effected.

In the production of tubes, the lubricant may be introduced between the interior surface of the plastic material and the exterior of the mandrel over which the tube is formed as well as the internal surface of the external die and the external surface of the tubing. For this purpose a circular passage for lubricant is provided at the inner end of the mandrel, or at any other desired point thereon.

Not only may various liquids be separately employed in carrying out the invention, but different liquids may be employed in combination. For example, mineral oil may be used in a first forming zone and another liquid, such as mercury, used in an adjacent temperature treatment zone. In this case the die may be vertical and the oil permitted to bubble upwardly through the mercury which may be applied under sufficient head to exert the desired hydrostatic pressure on the plastic, such as a pressure in excess of the vapor pressure in the plastic. A substantial layer of mercury may be provided between the plastic and the die or tubular member. The oil may be permitted to drain off at the top of the mercury. A pressure as high or higher than 10,000 pounds per square inch may be applied to the oil to force it upwardly between the plastic and the die and up through the mercury, the rate of oil flow being throttled as explained above. An initial "set" may be given to the plastic material in the oil-lubricated portion of the apparatus to give it dimensional stability and to prevent penetration of the lubricant into the plastic.

The condition of the plastic material or batch as supplied to the stuffer may vary. In addition to molding powder, batches in more or less plastic condition, or even in semi-liquid or liquid condition, may be fed into the stuffer and formed into the desired shapes by the novel method of this invention.

Instead of producing bubble-free shapes, the invention may be employed to produce ornamental bubble or foam-containing shapes, such as rods, in which gas or vapor bubbles are permitted to form within an exterior shell of bubble-free or clear material. This may be done by increasing the rate at which the shape is extruded so that the effect of pressure and temperature change, such as cooling, is insufficient to prevent the formation of gas bubbles inwardly of the clear outer layer.

Other changes and variations may be made in practicing the invention.

I claim:

1. The process of shaping solvent-free organic plastic material by extrusion thereof through a die of substantial length which comprises heating the material to a moldable condition, continuously forcing a stream of the heated material into said die and causing the material to assume the shape of the die by continuously applying pressure to said material, and maintaining between said material and said die throughout the length of the latter a continuous film of liquid lubricant substantially immiscible with said material by maintaining a source of supply of the lubricant at a pressure greatly in excess of the pressure applied to the material and continuously feeding said lubricant from said source of supply through a throttled passage into the die and about the material therein at such a rate per unit area of shape extruded per unit of time that the lubricant flows through the die in the form of a film on the die surface, while maintaining the lubricant in the passage substantially unyielding, whereby, in the event of sudden increase in the pressure in the plastic material in the die, back flow of the lubricant is prevented.

2. The process of shaping solvent-free organic plastic material by extrusion through a die of substantial length which comprises converting the organic plastic material into a tacky, viscous moldable condition by heat, continuously forcing a stream of the heated material into said die and causing the material to assume the shape of the die by continuously applying pressure to said material, and continuously feeding through a throttled passage to the die and about the material therein a liquid lubricant substantially immiscible with said material so as to maintain a continuous film of lubricant between said material and said die throughout the length of the latter by maintaining a supply of lubricant under pressure which is greatly in excess of that applied to said material, regulating the flow of lubricant into and through said passage and said die by throttling the feed into the passage at such a rate per unit of area of shape extruded per unit of time that the lubricant flows through the die as a film on its surface in substantial pressure equilibrium with the material within the die while unyieldingly maintaining the lubricant in said throttled passage between the throttling point therein and the die whereby in the event of sudden increase of pressure of the plastic material in the die interruption to the flow of the lubricant through the die is prevented.

3. The process of shaping solvent-free organic plastic material by extrusion thereof through a die of substantial length which comprises heating the material to a moldable condition, continuously forcing a stream of the heated material into said die and causing the material to assume the shape of the die by continuously applying pressure to said material, and maintaining between said material and said die throughout the length of the latter a continuous film of liquid lubricant substantially immiscible with said material by maintaining a source of supply of the lubricant at a pressure in excess of the pressure applied to the material and continuously delivering said lubricant from the source of supply through a throttled passage into the die in such manner as to form a reservoir of lubricant in the die at the place of entry of the material into the die and at such a rate per unit area of shape extruded per unit of time that the lubricant flows through the die in the form of a film on its surface in pressure equilibrium with the material within the die, while maintaining the lubricant in the passage substantially unyielding, whereby in the event of sudden increase in the pressure in the plastic material in the die, back flow of the lubricant is prevented.

4. The process of shaping solvent-free organic plastic material by extrusion through a die of substantial length which comprises converting the organic plastic material to a plastic and moldable condition by the application of heat thereto, forming said heated material into a compact plastic stream, constantly forcing said stream under continuous pressure through a jet into said die and causing the material to assume the shape of the die adjacent the outlet end of the jet, and maintaining a continuous film of lubricant between said material and said die throughout the length of the latter by maintaining a source of supply of lubricant under pressure which is greatly in excess of that applied to said material, delivering the lubricant from said source of supply through a throttled passage into an annular space about the jet at such a rate per unit area of shape extruded per unit of time that the lubricant flows through the die in the form of a film on its surface while unyieldingly maintaining the lubricant in said throttled passage whereby in the event of sudden increase of pressure of the plastic material in the die back flow of the lubricant is prevented.

5. The process of shaping solvent-free organic plastic material by extrusion thereof through a die of substantial length which comprises heating the material to a moldable condition, continuously forcing a stream of the heated material into said die and causing the material to assume the shape of the die by continuously applying pressure to said material, maintaining the organic plastic material during its passage through the die under a hydrostatic pressure in excess of the vapor pressure of any constituent thereof, controlling the temperature and temperature gradient of the organic plastic material during its passage through the die so as to prevent gas and vacuum bubbles forming and to permit the material to be handled upon emerging from the die, and maintaining between said material and said die throughout the length of the latter a continuous film of liquid lubricant substantially immiscible with said material by maintaining a source of supply of the lubricant at a pressure in excess to the pressure applied to the material and continuously feeding said lubricant from said source of supply through a throttled passage into the die and about the material therein at such a rate per unit area of shape extruded per unit of time that the lubricant flows through the die in the form of a thin film on its surface while maintaining the lubricant in the passage substantially unyielding, whereby, in the event of sudden increase in the pressure in the plastic material in the die, back flow of the lubricant is prevented.

6. The process of shaping solvent-free organic plastic material by extrusion thereof through a die of substantial length which comprises heating the material to a moldable condition, continuously forcing a stream of the heated material into said die and causing the material to assume the shape of the die by continuously applying pressure to said material, effecting an exchange of heat between the die and the shaped material to stiffen the material at a predetermined maximum rate less than the rate at which vacuum bubbles would form in the shaped material, and maintaining between said material and said die throughout the length of the latter a continuous film of liquid lubricant substantially immiscible with said material by maintaining a source of supply of the lubricant at a pressure in excess of the pressure applied to the material and continuously forcing said lubricant from said source of supply through a throttled passage into the die and about the material therein at such a rate per unit area of shape extruded per unit of time that the lubricant flows through the die in the form of a film on its surface in pressure equilibrium with the material within the die, while maintaining the lubricant in the passage substantially unyielding, whereby, in the event of sudden increase in the pressure in the plastic material in the die, back flow of the lubricant is prevented.

7. The process of shaping solvent-free organic plastic material by extrusion thereof through a die of substantial length which comprises heating the material to a moldable condition, continuously forcing a stream of the heated material into said die and causing the material to assume the shape of the die by continuously applying pressure to said material, and maintaining between said material and said die throughout the length of the latter a continuous film of liquid lubricant which is substantially immiscible with said material and is stable at the high temperature of the plastic material and has at least the viscosity of a lubricant having a flow of 1000 seconds at 375° F. by maintaining a source of supply of the lubricant at a pressure in excess of the pressure applied to the material and continuously forcing said lubricant from said source of supply through a throttled passage into the die and about the material therein at such a rate per unit area of shape extruded per unit of time that the lubricant flows through the die in the form of a thin film on its surface while maintaining the lubricant in the passage substantially unyielding, whereby, in the event of sudden increase in the pressure in the plastic material in the die, back flow of the lubricant is prevented.

8. The process of shaping solvent-free organic plastic material by extrusion through a die of substantial length which comprises converting the organic plastic material into a tacky, viscous moldable condition by heat, constantly forcing a stream of the heated material into said die and causing the material to assume the shape of the die by continuously applying pressure to said material, and continuously delivering through a throttled passage to the die and about the material therein a liquid lubricant substantially immiscible with said material so as to maintain a continuous film of lubricant between said material and said die throughout the length of the latter by maintaining a supply of lubricant under pressure which is greatly in excess of that applied to said material, regulating the flow of lubricant into and through said passage and said die by throttling the feed into the passage at a rate of approximately eight to twenty drops per minute while unyieldingly maintaining the lubricant in said passage between the throttling point and the die whereby in the event of sudden increase of pressure of the plastic material in the die back flow of the lubricant is prevented.

JAMES BAILEY.